United States Patent [19]
Guillet

[11] 4,012,130
[45] Mar. 15, 1977

[54] FRAMES FOR EYEGLASSES

[76] Inventor: Henri Guillet, 2 Blvd. Georges Clemenceau, 01100 Oyonnax, France

[22] Filed: Feb. 9, 1976

[21] Appl. No.: 656,665

[30] Foreign Application Priority Data

Feb. 12, 1975 France .............................. 75.04905

[52] U.S. Cl. .............................. 351/114; 351/118; 351/119; 351/123
[51] Int. Cl.² .......................................... G02C 5/06
[58] Field of Search .......... 351/113, 114, 118, 119, 351/123

[56] References Cited
UNITED STATES PATENTS

| 569,462 | 10/1896 | Meredith | 351/111 |
| 1,636,740 | 7/1927 | Hickey | 351/123 |
| 3,018,687 | 1/1962 | Sadel | 351/118 X |

FOREIGN PATENTS OR APPLICATIONS

| 376,978 | 6/1923 | Germany | 351/118 |
| 326,111 | 3/1930 | United Kingdom | 351/123 |

Primary Examiner—Paul A. Sacher
Attorney, Agent, or Firm—Dowell & Dowell

[57] ABSTRACT

An improved frame for eyeglasses in which each of the branches of the frame comprises a temple member having a rigid earpiece near its outer end, and having a flexible stranded earpiece member the inner end of which is carried by the temple member along its lower edge and the outer end of which is a curved flexible stranded member which can be used to grip the ear of the user, the present invention including means to retract the flexible earpiece when not desired, the invention being useful either in corrective eyeglasses or sunglasses.

6 Claims, 6 Drawing Figures

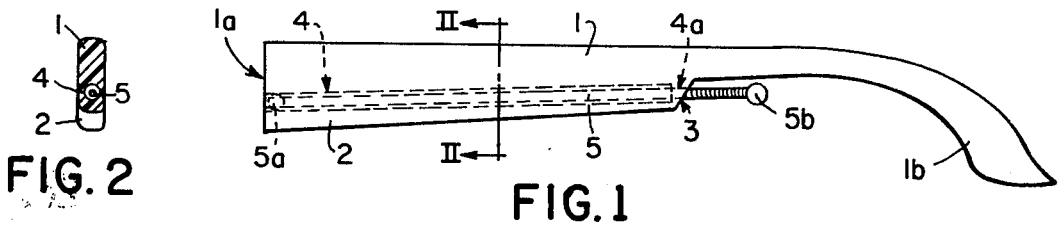
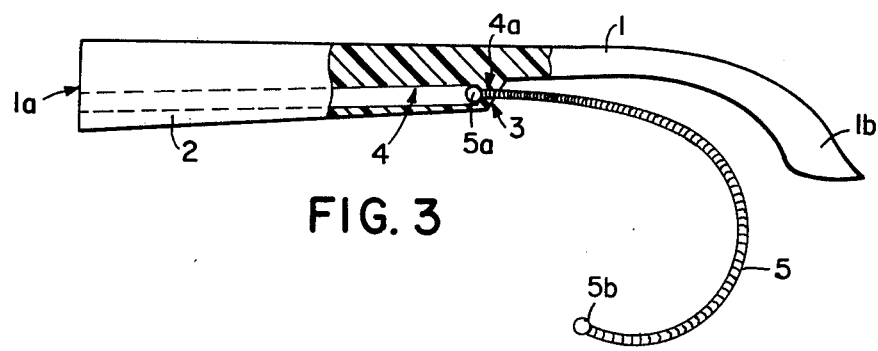
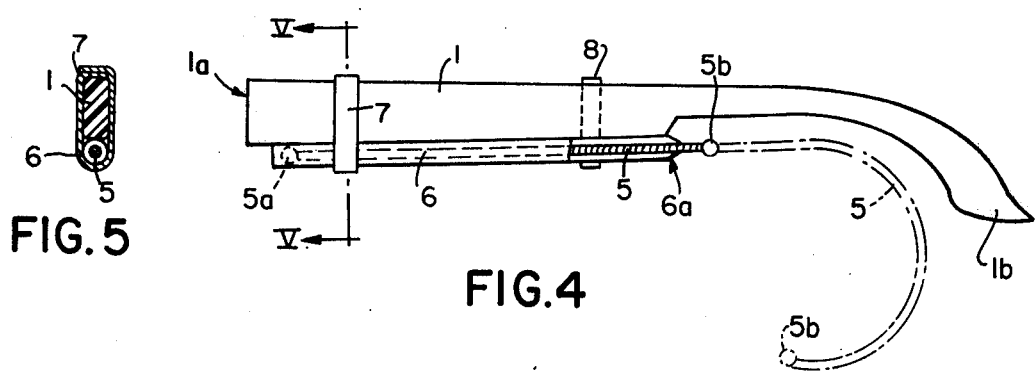
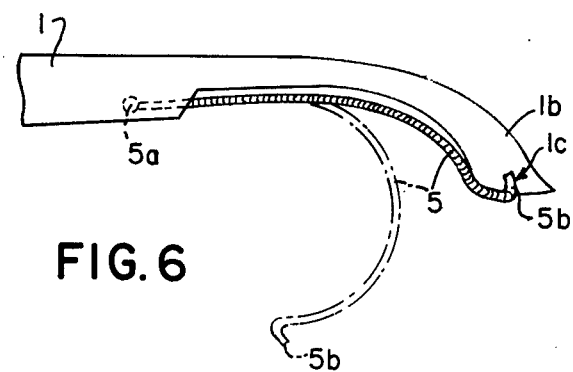

FRAMES FOR EYEGLASSES

The present invention relates to improvements in eyeglass frames, and more particularly to improvements in the temple members thereof at their earpiece ends.

The eyeglass frames presently manufactured generally include branches comprising the temple members, each one of which is provided with a partially flattened outer end appropriate for extending behind the ear and pressing against the head of the wearer. If the latter should make brisk movements, for example, when engaged in a sport, the glasses have a tendency to fall or be thrown from the head. For use under such conditions, there have been provided various accessories, for example those which connect the flattened extremities of the temple members using an elastic member which passes behind the head in order to fix the glasses thereto.

Some eyeglasses which are especially intended for use by persons engaged in sports have been provided with flexible stranded members having at their extremities spring-like members which pass around and grip the ear to achieve a good attachment of the frames to the face. The spring-like member usually comprises a flexible metal core which is wrapped with a protective layer which often takes the form of a suitable wire wrapped around the core. The wearing of such glasses is uncomfortable because of the grip of the spring members against the ears, whereby these eyeglasses are usually not worn continuously.

The improvements which comprise the object of the present invention are intended to provide eyeglasses whose temple members each includes a rigid flattened earpiece, whereby the glasses can be worn for ordinary careful performance without discomfort; and on the other hand providing a second earpiece taking the form of rectractable flexible means useful to retain the glasses tightly against the face of the wearer, the latter earpiece preferably taking the form of a spring-like member extending around and gripping the rear of the ear. This permits extra secure attachment of the glasses to the face, but only when such attachment is desired.

The annexed drawing shows illustrative embodiments providing a better understanding of the invention, the characteristics thereof, and the advantages which these characteristics provide.

THE DRAWINGS

FIG. 1 shows one branch or temple member for an eyeglass frame made according to the present invention;

FIG. 2 is a cross-sectional view taken through line II—II of FIG. 1;

FIG. 3 is a view similar to FIG. 1, but showing the temple member having its flexible earpiece pulled out in useful position;

FIG. 4 is a view similar to FIG. 1, but showing a modified form of the invention;

FIG. 5 is a cross-sectional view taken along line V—V of FIG. 4; and

FIG. 6 is a partial view of a temple member showing the end thereof made according to a further modified form of the invention.

Referring now to FIG. 1, the drawing shows a branch or temple member 1 suitable to be hinged at its inner extremity 1a to the frame of an eyeglass. The outer end 1b of the temple member 1 located opposite the end 1a takes the form of a flattened earpiece intended to be located at the level of the top of the ear of the wearer. Usually flat earpieces of this type are curved downwardly in such a way that they extend a certain distance behind the ear.

According to one embodiment of the invention there is provided along the lower edge of the inner portion of the temple member 1 an elongated bar portion 2 whose length is less than the length of the lower edge of the inner portion of the temple member so that it provides a shoulder 3 oriented obliquely with respect to the general longitudinal axis of the temple member and faced toward the outer portion of the temple member comprising the earpiece end 1b of the latter. The shoulder could of course be oriented somewhat differently.

As shown in FIGS. 2 and 3, the elongated bar portion 2 is provided with a bore 4 extending from the inner end 1a of the inner portion of the temple member, the internal diameter of the bore being restricted in the vicinity of an opening at the right-hand end at the shoulder 3 which constitutes an abutment 4a. Within the bore 4 there is engaged a spring-like flexible stranded member 5 which is shaped when in relaxed position as a flexible hook intended to cooperate with and grip to the rear surface of the ear as was explained above. The inner end 5a of the flexible earpiece member 5 is enlarged in a manner to serve as a stop when brought in contact with the abutment 4a of the bore 4. During normal wearing of the glasses the flexible stranded earpiece member 5 is retracted within the sheath formed by the bar portion 2 and the bore 4, only its outer end 5b extending slightly therefrom. If the wearer intends to perform movements likely to cause the glasses to fall off, he will pull each flexible stranded earpiece member 5 out of the sheath and place it behind his ear as explained above so as to affix the glasses tightly against the face.

Of course, as shown in FIGS. 4 and 5, the sheath beneath the inner portion of the temple member 1 could be provided in any appropriate manner, for instance, taking the form of a separate sheath 6 used in the same manner as the bar portion 2, that is to say including a bore 6a in which the flexible temple member 5 is telescopically captivated. The attachment of the sheath 6 can be achieved by means of suitable clasps such as those labelled 7 and 8.

According to another embodiment of the invention, the inner end of the flexible stranded earpiece 5 is permanently fixed with respect to the temple member 1, as shown in FIG. 6, so that it always occupies a position adjacent to the position of the ear. In its normal position of utilization, shown in solid lines, the flexible stranded earpiece 5 illustrated in FIG. 6 follows the same general contour as the earpiece member 1b of the temple member 1 because of the fact that its outer end 5b is engaged in a slot 1c of the flattened member 1b. When the wearer decides to attach the glasses to his face more tightly, he merely disengages the outer end 5b of each flexible earpiece 5, which then grips the wearer more tightly behind the ear.

It should be noted that the outer extremity 5b is bent to form a hook at its rear end which can be fixed within the slot 1c, the hook and slot comprising means for retracting the flexible earpiece member.

Thus, the invention provides an eyeglass frame which can be used even while executing vigorous movements, but the wearing of this frame not involving any discomfort during normal non-vigorous utilization because the special earpiece member can be retracted.

It is intended that the preceding description is given merely by way of example and does not limit the extent of the described invention which can be varied to include the use of other equivalents. In particular, the earpiece member 5, or its equivalents, could be attached directly to the outer end of the flattened rigid earpiece 1b of each temple member 1 and shaped to assume a form which will press directly against the wearer's of the ear.

I claim:

1. In an eyeglass frame of the type having temple members extending rearwardly from a main frame to which they are pivoted, each temple member comprising:
    a rigid member having an inner end and having an outer end terminating in a rigid earpiece shaped to pass over the ear and extend behind it;
    a flexible earpiece member attached to said temple member intermediate its inner and outer ends and shaped normally to assume an arcuate position beneath the rigid earpiece to grip the ear and hold the glasses frame more tightly against the face of the wearer;
    means selectively operable to retract the flexible earpiece member from its normal position and release its grip on the ear,
    said selectively operable means comprising means for retracting the flexible earpiece member and positioning and holding the flexible member against the underside of the rigid earpiece, whereby the flexible earpiece member lies along the rigid earpiece and conforms with the shape thereof.

2. In a frame as set forth in claim 1, said flexible earpiece member having one end fixed to the rigid temple member between its inner end and its rigid earpiece, said means to retract the flexible member including a slot in the outer end of said rigid earpiece and a hook at the outer end of the flexible earpiece member disposed to be selectively engageable in said slot to retract and hold the flexible earpiece member to substantially conform with the contour of the rigid earpiece.

3. In an eyeglass frame of the type having temple members extending rearwardly from a main frame to which they are pivoted, each temple member comprising:
    a rigid member having an outer portion comprising a rigid earpiece shaped to lie against the head of the wearer and to pass over the ear and extend beyond it; and the member having an inner portion joined at one end to said outer portion and coupled at its other end to said main frame;
    a sheath extending longitudinally of the rigid member and located along the bottom of said inner portion, the sheath comprising a bore extending longitudinally toward the main frame from a shoulder located adjacent the junction of said inner and outer portions; and
    a flexible elongated earpiece member extending through the shoulder of the sheath into the bore, the flexible member being movable between a retracted position in which most of its length is within the bore and an extended position in which it extends from the bore and assumes an arcuate shape beneath the rigid earpiece, and the flexible member having a spring-like memory urging it to grip the ear and hold the glasses frame more securely on the head of the wearer.

4. The frame as set forth in claim 3, wherein said sheath is integrally formed with the inner portion of said temple member, the bottom of said inner portion stepping upwardly to form said shoulder where the inner portion of the temple member joins the outer portion thereof.

5. The frame as set forth in claim 3, wherein said sheath comprises a separate tubular member located beneath and extending along said inner portion of the temple member, one end of said tubular member comprising said shoulder, and clasp means securing said sheath to said inner temple portion of the temple member.

6. The frame as set forth in claim 3, wherein said flexible earpiece member has its inner end telescopically received in said sheath, and the inner end of the flexible earpiece member having an enlargement shaped to interfere with the shoulder and prevent complete withdrawal of the earpiece member from the bore.

* * * * *